3,310,458
TRANSPARENT LAMINATES AND METHOD FOR PRODUCING SAME
Paul T. Mattimoe and John J. Hofmann, Toledo, Ohio, assignors to Libbey-Owens-Ford Glass Company, Toledo, Ohio, a corporation of Ohio
No Drawing. Filed Mar. 14, 1963, Ser. No. 265,038
13 Claims. (Cl. 161—248)

This invention relates generally to the manufacture of laminates, and more particularly is concerned with an improved method for producing novel, transparent laminates including one or more sheets of a stretched acrylic resin and a polyvinyl butyral interlayer.

Acrylic resins, and particularly the polymethacrylates, have found a major use in the manufacture of aircraft canopies or glazings due in part to their outstanding optical properties, e.g. clarity and transparency. Two polymethacrylate resins particularly well adapted for this purpose are marketed by Rohm & Haas under the trade designations "Plexiglas II" and "Plexiglas 55," both of which resins are essentially comprised of polymethylmethacrylate. The two materials are commercially available in cast sheet form and differ principally in heat resistance, the "Plexiglas 55" being the more heat resistant of the two materials.

While the cast acrylic sheeting may be employed in the production of aircraft glazings, it has been found that the impact strength, resistance to crack propagation, and the craze resistance thereof can be substantially improved by stretching of the as-cast sheeting. While not attempting to set forth any precise or uncontradictory theory in explanation of these strength improvements, it is believed that such stretching affects the molecular structure of the polymer. It appears to disentangle and uncoil the linear molecules and partially orient them parallel to the direction of stretch. This in turn results in the up-grading of the impact strength, resistance to crack propagation and craze resistance properties without adversely affecting the excellent optical properties of the material.

The optimum improvement in the physical properties of an acrylic sheet is obtained when such sheet material is stretched about 75 to 100 percent either biaxially or multi-axially. Such stretching particularly produces a many fold increase in resistance to crack propagation. This property, which is a measure of the "toughness" or "shatter resistance" of the material, is of obvious importance in the glazing of aircraft which are pressurized during flight.

A commonly accepted method for quantitatively expressing the crack propagation resistance of stretched acrylic materials is the $dW/dA$ value which is a measure of the work absorbed per unit area of crack extension during rapid crack growth. As-cast acrylic sheet materials show a $dW/dA$ value of approximately 4. When stretched 75 to 100 percent, this value is increased to from 20 to 30. At this level of resistance to crack propagation, the stretched acrylics show excellent resistance to "blow-out" failure when damaged during pressurized flight. As a result of the improved properties possessed by the stretched acrylics, they have, to a considerable extent, replaced the as-cast sheeting for aircraft glazing use.

It will be appreciated that for certain purposes it is desirable to laminate the stretched acrylic sheeting either to another sheet of stretched acrylic, to an as-cast sheet of acrylic, or to another plastic material in producing aircraft glazings. For example, it is desirable to laminate the stretched acrylic sheet if heating means for de-icing or de-fogging, such as electrically conducting films or wire grids, are to be included as part of the aircraft windshield or window. Where a transparent electrically conductive film is used, lamination serves to protect the rather fragile film against damage by scratching, or attack by moisture or corrosive gases in the atmosphere. Also, lamination will provide an insulating cover for the film thereby preventing accidental grounding. Where a conducting wire grid is used for de-icing or de-fogging, it can conveniently be imbedded in or heat sealed to a sheet of polyvinyl butyral interlayer which may then be laminated between a sheet of stretched acrylic and a second sheet which may be either stretched acrylic or some other synthetic plastic material.

Now, while the desirability of a laminated structure including a stretched acrylic sheet is evident from the above discussion, it has been found that the conventional methods currently employed for laminating as-cast acrylic sheets are not satisfactory for manufacturing laminates comprising one or more sheets of stretched acrylic. Thus, it has been found that a sheet of stretched acrylic, when heated to the temperatures normally employed for laminating composite plastic assemblies, i.e. 275° F. to 300° F., shrinks back with considerable force to its original pre-stretched dimensions. In other words, the stretched acrylics possess memory characteristics which become effective at temperatures in the range conventionally employed for laminating and make impossible the production of an acceptable structure including at least one sheet of a stretched acrylic by present practices.

In addition, it has been found that laminating stretched acrylics at temperatures higher than about 230° F. reduces the $dW/dA$ value to an unsatisfactorily low level. For example, if the $dW/dA$ value is appreciably lower than 20, the material may show inadequate resistance to crack propagation with consequent risk of disastrous failure with the use of the material as an aircraft glazing. In this respect, the effect on crack propagation resistance of high temperature autoclaving cycles is illustrated in the following table which shows the lowering of the $dW/dA$ values resulting from exposure of a sheet of stretched "Plexiglas 55" to autoclave cycles comprising 30 minutes at 225 p.s.i. and the indicated temperature:

| Autoclave Temperature, °F. | $dW/dA$ Value | |
|---|---|---|
| | Before Autoclaving | After Autoclaving |
| 195 | 24.9 | 21.7 |
| 210 | 24.9 | 21.0 |
| 215 | 24.9 | 21.0 |
| 225 | 24.9 | 18.4 |
| 250 | 24.9 | 14.4 |

On the other hand, if it is attempted to reduce the laminating temperatures to a level below the relaxation temperature of the stretched acrylic and below the temperature at which the $dW/dA$ value declines below an acceptable value, adequate adhesion of the stretched acrylic sheet to the polyvinyl butyral interlayer is not obtained since the adhesives now known in the art and used for laminating as-cast acrylic sheeting to polyvinyl butyral interlayers, for example, copolymers of acrylic esters with acrylic or methacrylic acids, or hydrolysis products of silicate esters combined with plasticizers such as dimethyl phthalate, are not effective at these low temperatures.

It has now been discovered, and the instant invention is based upon such discovery, that an excellent, novel transparent laminate comprising at least one sheet of a stretched acrylic resin can be produced by a method which includes coating the surface of the stretched acrylic sheet with either hydrolyzable esters of ortho titanic acid or, preferably, with a mixture of such titanate esters with hydrolyzable silicate esters. It has been found that the use of such materials enables satisfactory lamination of the stretched acrylics at temperatures in the range of about 200° F. to 225° F., and results in a transparent laminate having combined strength and optical properties not heretofore obtainable.

It is therefore a principal object of the present invention to provide a novel transparent laminate including at least one sheet of a stretched acrylic resin and a vinyl butyral interlayer.

Another object of the invention is the provision of an improved method for producing transparent laminates including at least one sheet of a stretched acrylic resin and a vinyl butyral interlayer.

Another object of the invention is the provision of a method for producing laminates of the above type wherein the stretched acrylic resin sheet of the laminate has an excellent crack propagation resistance value, i.e. $dW/dA$ value, of at least about 20.

It is a further object of the invention to provide a method of laminating stretched acrylic resins wherein temperatures not greater than 225° F. may be satisfactorily employed in such method.

It is still a further object of the present invention to provide an electrically conductive, transparent laminate including a first sheet of a stretched acrylic resin, a vinyl butyral interlayer, and a second sheet composed of a synthetic resinous material.

Other objects and advantages will in part be apparent and will in part appear hereinafter.

For a better understanding of the nature and objects of the invention, reference should be had to the following detailed description which is intended only to illustrate and disclose, but in no way limit, the invention.

According to the invention, an improved process for producing novel transparent laminates including at least one sheet of a stretched acrylic resin and a vinyl butyral interlayer is provided. Such process, in accordance with a first embodiment thereof, briefly comprises applying a solution of a hydrolyzable ester of ortho titanic acid to a surface of the stretched acrylic resin sheet, drying such stretched acrylic resin sheet, e.g. for about 30 minutes to one hour at 150° F., to form an adherent coating of such ester on the surface of the sheet, assembling the stretched acrylic resin sheet with a vinyl butyral resin interlayer such that the coated surface of the former is in contact with the interlayer, and thereafter simultaneously subjecting the assembly to a temperature in the range of approximately 200° F. to 230° F. and a pressure in the range of about 50 to 300 p.s.i.

As above noted, the adhesive employed in accordance with the invention includes a hydrolyzable ester of ortho titanic acid. In general, it has been found to be preferred to employ esters having fewer than 10 carbon atoms, with particularly good results having been obtained when using tetraisopropyl titanate, 2-ethylbutyl titanate, and tetrabutyl titanate. Also, it has been found that the solution normally should contain approximately 1 to 20 percent by weight of the titanate ester, although greater amounts or percentages may be employed without substantially adversely affecting the results obtained. In other words, the chief factor to be considered as to determining the upper limit of weight percent of ester used is, in essence, the commercial application of the solution, with percentages greater than can be easily applied by commercially acceptable methods such as spraying not being favored. In this respect, of course, a higher percentage of ester enables a smaller volume or weight of the solution to be applied per square inch of the stretched acrylic sheet.

The particular identity of the solvent employed is not critical and any material may be used which will not adversely affect the acrylic resin sheet, i.e. will not cause a crazing thereof, etc. Good results have been obtained with the use of butyl and isopropyl alcohols.

In producing a laminate in accordance with the invention, a second plastic sheet which may be another stretched acrylic sheet, an as-cast acrylic sheet, or a sheet of any other synthetic resinous material is coated with the hydrolyzable ester adhesive, dried, and thereafter assembled with the stretched acrylic sheet and interlayer such that the coated side of the second sheet also is in contact with the interlayer. In the event it is desirous to produce an electrically conductive laminate, an electrically conductive film, for example, of the type described in United States Patent No. 2,628,927, issued February 7, 1953 to W. H. Colbert et al., is provided on a surface of one of the synthetic resin sheets, with this surface then placed in contact with the vinyl butyral interlayer. In this connection, it has been found not to be necessary to apply the hydrolyzable ester adhesive to the electrically conductive film if it is employed since it is itself adherent to the vinyl butyral interlayer.

Now, while acceptable results in the production of a strong and stable laminate including at least one stretched acrylic sheet have been obtained when using a solution containing only a hydrolyzable ester of ortho titanic acid as the adhesive material, it has been found to be extremely difficult to obtain laminate transparencies of more than about 78 percent with the use of these adhesives in a non-electrically conducting unit and more than about 60 percent if the unit is made electrically conductive, i.e. includes an electrically conductive film on a surface of one of the synthetic resin sheets. However, it has been discovered that a solution including a mixture of an ester of ortho titanic acid with a hydrolyzable silicate ester results in an adhesive which enables the production of excellent strong and stable laminates of the class described and, most importantly, laminates which possess transparencies of about 90 percent if not electrically conductive and about 70 to 75 percent if electrically conductive. This material then represents a preferred embodiment of adhesive for use in accordance with the invention.

As is the case where only the titanate ester is employed, good results have been obtained in accordance with the preferred embodiment of the invention where the ester mixture comprises approximately 1 to 20 percent by weight of the solution. Additionally, it has been found that the ratio of titanate ester to silicate ester in solution should be in the range of 1:3 to 3:1 for best results. Also, as was discussed with regard to the titanate esters, it is preferred that silicate esters having fewer than 10 carbon atoms be employed. In this respect, excellent results have been obtained with the use of tetraethyl ortho silicate and tetrapropyl silicate.

In laminating the stretched acrylic resin sheet or the composite assembly of such sheet and a second synthetic resin sheet to a vinyl butyral interlayer, a conventional "bag lamination" technique may be satisfactorily employed. Such method briefly comprises placing the composite assembly in a plastic bag, which bag is then sealed by securing the edges of its mouth together by an adhesive or other means that will provide an air-tight seal. A tube is sealed between the sides of the mouth of the bag so that it communicates with the space therewithin and air then extracted through the tube to provide a vacuum of about 28 to 29 inches of mercury within the plastic bag. The unit is kept at room temperature for approximately 30 minutes to remove all of the air from between the sheets.

The evacuated bag and the assembly sealed therein are then suspended in an oil autoclave and heated for approximately 25 to 35 minutes at a temperature of about 200° F. to 225° F. under a pressure in the range of 50 to 300 pounds per square inch.

The resulting novel product in accordance with the invention thus comprises a sheet of a stretched acrylic resin, a layer of a hydrolyzed titanate ester or a mixture of hydrolyzed titanate-silicate esters adhered to one surface of the stretched acrylic resin sheet, a vinyl butyral interlayer bonded on one side to the free surface of said ester or ester mixture layer and a sheet of a synthetic resin material bonded through the ester adhesive to the other side of the vinyl butyral interlayer or through an electrically conductive film if it is desirous that the unit comprise the latter.

The following examples constitute the best presently known mode for practicing the instant invention:

Example I

A solution was prepared containing five percent by weight of tetraisopropyl titanate in n-butanol. This solution was applied by a spray gun to one surface of a .375 inch thick acrylic sheet which had been multiaxially stretched 100 percent. The solution was applied to give a uniform coverage of approximately one-fourth of a fluid ounce per square foot of the surface sprayed. The coated sheet was then placed in an oven and dried by heating it at a temperature of 150° F. for a period of one hour.

The dried coated stretched acrylic sheet was next assembled with a .050 inch thick interlayer of polyvinyl butyral plastic and a .125 inch thick sheet of an as-cast acrylic resin also coated on one surface with the five percent by weight solution of tetraisopropyl titanate and dried in the same manner as the stretched acrylic sheet. In this respect, the sheets were positioned with the coated surfaces thereof in contact with the polyvinyl butyral resin which was interposed therebetween.

Glass cover plates were assembled to the outside surfaces of the as-cast and stretched acrylic sheeting to protect it against scratching or other damage. This assembly was then placed in a thin, flexible plastic bag which was evacuated to provide a vacuum of 28 inches of mercury therein and sealed off. After 30 minutes the bag and its contents were placed in an oil autoclave and heated under a pressure of 50 pounds per square inch for 30 minutes at a temperature of 215° F. After cooling under pressure, the laminate was removed from the plastic bag and the glass cover plates were separated from the laminate.

The resulting laminate was optically clear and showed excellent adhesion of both the stretched acrylic sheet and the as-cast acrylic sheet to the polyvinyl butyral interlayer. However, due apparently to a high reflectance of the adhesive layer for visible light, the laminate possessed a somewhat reduced visible light transmittance of 77 percent. This high reflectance of the adhesive layer could be objectionable for some applications since it results in an increase of intensity of reflected images.

Example II

A laminate was prepared from the same materials and in exact accordance with the process set forth in Example I, except that the adhesive employed consisted of five percent by weight of 2-ethylbutyl titanate dissolved in n-butanol. The properties of the resulting laminate were, to all intents and purposes, the same as those of the laminate produced in Example I.

Example III

An adhesive was prepared by dissolving five grams of tetrabutyl titanate in 100 grams of n-butyl alcohol. A surface of a .375 inch thick sheet of acrylic resin which had been multiaxially stretched 100 percent was coated with this adhesive by spraying the surface with approximately one-fifth of a fluid ounce of the adhesive solution per square foot of plastic surface. After drying the sprayed sheet in an oven for one hour at 150° F., the coated stretched acrylic sheet was assembled with a .050 inch thick polyvinyl butyral interlayer and a sheet of plastic obtained under the trade designation "CR-39" from the Cast Optics Corporation of Hackensack, N.J. This plastic is essentially a polymerized diethylene glycol bis allyl carbonate. One surface of the CR-39 sheet was provided with an electrically conductive film of the type described in United States Patent No. 2,628,927, issued February 7, 1953, to W. H. Colbert et al. and was equipped with electrodes and leads which would permit connection of the electrically conductive film to a suitable power source. No adhesive was applied to the electrically conductive film. The coated stretched acrylic sheet was then assembled with the CR-39 sheet and the polyvinyl butyral interlayer such that the coated surface of the stretched acrylic sheet and the surface of the CR-39 sheet containing the electrically conductive film were in contact with the interposed polyvinyl butyral layer.

After assembly, the composite structure described above was placed between protective glass cover plates and inserted in a thin, flexible plastic bag which was evacuated to provide a vacuum of 28 inches of mercury therein and sealed off. The evacuated bag containing the assembly was there after placed in an oil autoclave and the assembly laminated under a pressure of 225 pounds per square inch at a temperature of 225° F. for a period of 30 minutes. The laminate was cooled under pressure and then removed from the autoclave.

After separation of the resulting laminate from the glass cover plates, inspection showed the laminate to be optically clear and possess excellent adhesion of both the stretched acrylic sheet and the CR-39 sheet to the polyvinyl butyral interlayer. The visible light transmittance of the laminate was found to be approximately 60 percent due in part to relatively high reflectance loss of the adhesive layer applied to the stretched acrylic ply and in part to losses by absorption and reflection of the electrically conducting layer.

Example IV

An adhesive for use in accordance with the invention was prepared by dissolving five milliliters of isopropyl titanate and five milliliters of tetraethyl orthosilicate in 90 milliliters of n-butanol. One surface of a .375 inch thick sheet of heat resistant acrylic resin manufactured by the Rohm & Haas Corporation of Philadelphia, Pa., under the trade designation "Plexiglas 55" and which had been multiaxially stretched 100 percent was spray coated with the above titanate-silicate ester adhesive at a rate of one-sixth of a fluid ounce per square foot of surface coated. After spraying, the adhesive coated "Plexiglas 55" sheet was dried in an oven for one hour at 150° F., removed from the oven and assembled with an interlayer composed of a sheet of .050 inch thick polyvinyl butyral resin and a .060 inch thick sheet of CR-39 plastic provided with an electrically conductive film of the type described in the aforementioned United States Patent No. 2,628,927. In assembling these sheets, the coated surface of the "Plexiglas 55" sheet and the surface of the CR-39 sheet provided with the electrically conductive film were placed in contact with the interposed polyvinyl butyral layer.

The resulting assembly was placed between protective glass cover plates and inserted in a thin, flexible plastic bag. The bag was evacuated to provide a vacuum of 28 inches of mercury therein and then sealed off. After 30 minutes the bag and its contents were placed in an oil autoclave maintained at 215° F. and at a pressure of 225 pounds per square inch for 30 minutes. The resulting laminate, after removal thereof from the plastic bag and the autoclave, showed excellent adhesion of the "Plexiglas 55" sheet and the CR-39 sheet to the polyvinyl butyral interlayer. Additionally, the visible light transmittance of the laminate was found to be 73 percent with the adhesive layer being substantially free from detrimental reflective properties.

Example V

A solution was prepared by dissolving five parts by volume of tetraethyl orthosilicate and eight parts by volume of tetrakis (2-ethylhexyl) titanate in 87 parts by volume of isopropyl alcohol. This adhesive was then sprayed on one surface of a .375 inch thick sheet of "Plexiglas 55" which had been previously multiaxially stretched 100 percent. The solution was applied in an amount of one-fifth of a fluid ounce of solution per square foot of surface. After spraying, the adhesive coated "Plexiglas 55" sheet was dried in an oven for one hour at 150° F., removed from the oven and assembled with an interlayer of .050 inch thick polyvinyl butyral resin and a .060 inch thick sheet of CR–39 plastic provided with an electrically conductive film of the type described in the aforementioned United States Patent No. 2,628,927. In assembling these sheets, the coated surface of the "Plexiglas 55" sheet and the surface of the CR–39 sheet provided with the electrically conductive film were placed in contact with the interposed polyvinyl butyral layer.

The resulting assembly was placed between protective glass cover plates and inserted in a thin, flexible plastic bag. The bag was evacuated to provide a vacuum of 28 inches of mercury therein and then sealed off. After 30 minutes, the bag was placed in an oil autoclave maintained at 215° F. and at a pressure of 225 pounds per square inch for 30 minutes. The resulting laminate, after removal thereof from the plastic bag and the autoclave, showed excellent adhesion of the "Plexiglas 55" sheet and the CR–39 sheet to the polyvinyl butyral interlayer. Additionally, the visible light transmittance of the laminate was found to be 71.5 percent with the adhesive layer being substantially free from detrimental reflective properties.

While what has been described is considered to be the more advantageous embodiments of the invention, it will be apparent that modifications and variations can be made in the compositions and specific procedures discussed without departing from the spirit and scope of the present invention, as those skilled in the art will readily understand. Such modifications and variations are considered to be within the purview and scope of the invention as defined by the appended claims.

We claim:
1. A method of producing transparent laminates including at least one sheet of a stretched resin consisting essentially of polymethylmethacrylate and a vinyl butyral resin interlayer, comprising applying a solution of a mixture of a hydrolyzable ester of ortho titanic acid and a hydrolyzable silicate ester to a surface of said stretched resin sheet, drying said acrylic resin sheet to form an adherent coating of hydrolyzed mixed titanate-silicate esters on said surface, assembling said stretched resin sheet with said vinyl butyral resin interlayer such that said coated surface of the former is in contact with said interlayer, and thereafter subjecting said assembly to a temperature in the range of approximately 200° F. to 230° F. and a pressure in the range of about 50 to 300 p.s.i.

2. A method of producing transparent laminates including at least one sheet of a stretched resin consisting essentially of polymethylmethacrylate and a vinyl butyral resin interlayer, comprising applying a solution containing from about 1 to 20 parts by weight of a mixture of a hydrolyzable ester of ortho titanic acid and a hydrolyzable silicate ester to a surface of said stretched resin sheet, drying said acrylic resin sheet to form an adherent coating of hydrolyzed mixed titanate-silicate esters on said surface, assembling said stretched resin sheet with said vinyl butyral resin interlayer such that said coated surface of the former is in contact with said interlayer, and thereafter subjecting said assembly to a temperature in the range of approximately 200° F. to 230° F. and a pressure in the range of about 50 to 300 p.s.i.

3. A method of producing transparent laminates including at least one sheet of a stretched resin consisting essentially of polymethylmethacrylate and a vinyl butyral resin interlayer, comprising applying a solution containing from about 1 to 20 parts by weight of a mixture of a hydrolyzable ester of ortho titanic acid and a hydrolyzable silicate ester in which the ratio of titanate ester to silicate ester is in the range of approximately 1:3 to 3:1 to a surface of said stretched resin sheet, drying said stretched resin sheet to form an adherent coating of hydrolyzed mixed titanate-silicate esters on said surface, assembling said stretched resin sheet with said vinyl butyral resin interlayer such that said coated surface of the former is in contact with said interlayer, and thereafter subjecting said assembly to a temperature in the range of approximately 200° F. to 230° F. and a pressure in the range of about 50 to 300 p.s.i.

4. A method of producing transparent laminates as claimed in claim 3, wherein both said titanate ester and said silicate ester have no more than 10 carbon atoms.

5. A method of producing transparent laminates as claimed in claim 3, wherein said titanate ester is selected from the group consisting of tetraisopropyl titanate, 2-ethylbutyl titanate and tetrabutyl titanate.

6. A method of producing transparent laminates as claimed in claim 3, wherein said silicate ester is selected from the group consisting of tetraethyl ortho-silicate and tetrapropyl silicate.

7. A method of producing a transparent electrically conductive laminate including a first sheet of a stretched resin consisting essentially of polymethylmethacrylate, a vinyl butyral interlayer and a second plastic sheet, comprising applying a transparent electrically conductive metal film to one surface of said second plastic sheet, applying a solution of a mixture of a hydrolyzable ester of ortho titanic acid and a hydrolyzable silicate ester to a surface of said stretched resin sheet, drying said stretched resin sheet to form an adherent coating of hydrolyzed mixed titanate-silicate esters on said stretched sheet surface, assembling said stretched sheet, said vinyl butyral interlayer and said second plastic sheet such that the coated surface of said stretched acrylic sheet and the surface of said second plastic sheet containing said electrically conductive film are in contact with opposite surfaces of said vinyl butyral interlayer, and thereafter simultaneously subjecting said assembly to a temperature in the range of approximately 200° F. to 225° F. and a pressure in the range of about 50 to 300 p.s.i. to integrally bond said assembly into a composite unit.

8. A method of producing a transparent laminate as claimed in claim 7, wherein both of said titanate ester and said silicate ester have no more than 10 carbon atoms.

9. A method of producing a transparent laminate as claimed in claim 7, wherein said titanate ester is selected from the group consisting of tetraisopropyl titanate, 2-ethylbutyl titanate and tetrabutyl titanate.

10. A method of producing a transparent laminate as claimed in claim 7, wherein said mixture of a hydrolyzable ester of ortho titanic acid and a hydrolyzable silicate ester comprises approximately 1 to 20 percent by weight of said solution and the ratio of titanate ester to silicate ester in said mixture is in the range of about 1:3 to 3:1.

11. A transparent laminate, comprising a sheet of a stretched resin consisting essentially of polymethylmethacrylate, a layer composed of a mixture of hydrolyzed titanate-silicate esters adhered to one surface of said stretched resin sheet, a vinyl butyral resin interlayer bonded on one side to the free surface of said hydrolyzed titanate-silicate ester layer, and a sheet of a synthetic resin material bonded to the other side of said vinyl butyral interlayer.

12. A transparent laminate as claimed in claim 11, wherein a layer composed of a mixture of hydrolyzed titanate-silicate esters is interposed between said other side of said vinyl butyral interlayer and said synthetic resin sheet and integrally bonded to both.

13. A transparent electrically conducting laminate, comprising a sheet of a stretched resin consisting essentially of polymethylmethacrylate, a layer composed of a mixture of hydrolyzed titanate-silicate esters adhered to one surface of said stretched resin sheet, a vinyl butyral resin interlayer bonded on one side to the free surface of said titanate-silicate ester layer, a sheet of a synthetic resin material, and an electrically conductive transparent film adhered to one surface of said synthetic resin sheet, said synthetic resin sheet being bonded to the free side of said vinyl butyral resin interlayer through said electrically conductive transparent film.

References Cited by the Examiner

UNITED STATES PATENTS

| 3,002,854 | 10/1961 | Brill | 117—121 |
| 3,074,841 | 1/1963 | King et al. | 161—248 |
| 3,135,645 | 6/1964 | Burkley et al. | 161—233 |

EARL M. BERGERT, *Primary Examiner.*

JACOB H. STEINBERG, *Examiner.*

W. J. VANBALEN, *Assistant Examiner.*